(No Model.) 2 Sheets—Sheet 1.
T. B. FOGARTY.
PROCESS OF MAKING AMMONIA.
No. 417,778. Patented Dec. 24, 1889.
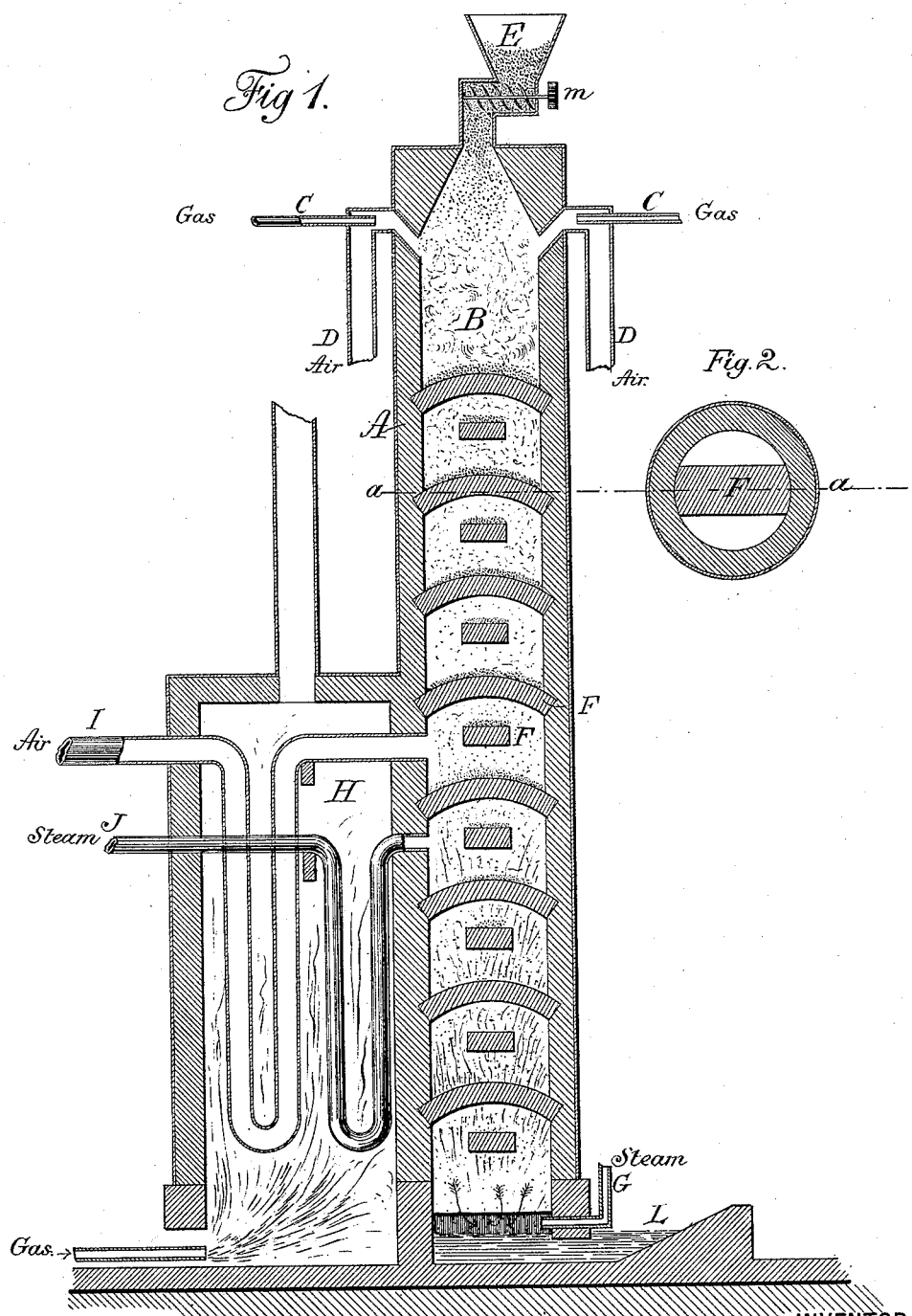

(No Model.) 2 Sheets—Sheet 2.
T. B. FOGARTY.
PROCESS OF MAKING AMMONIA.
No. 417,778. Patented Dec. 24, 1889.
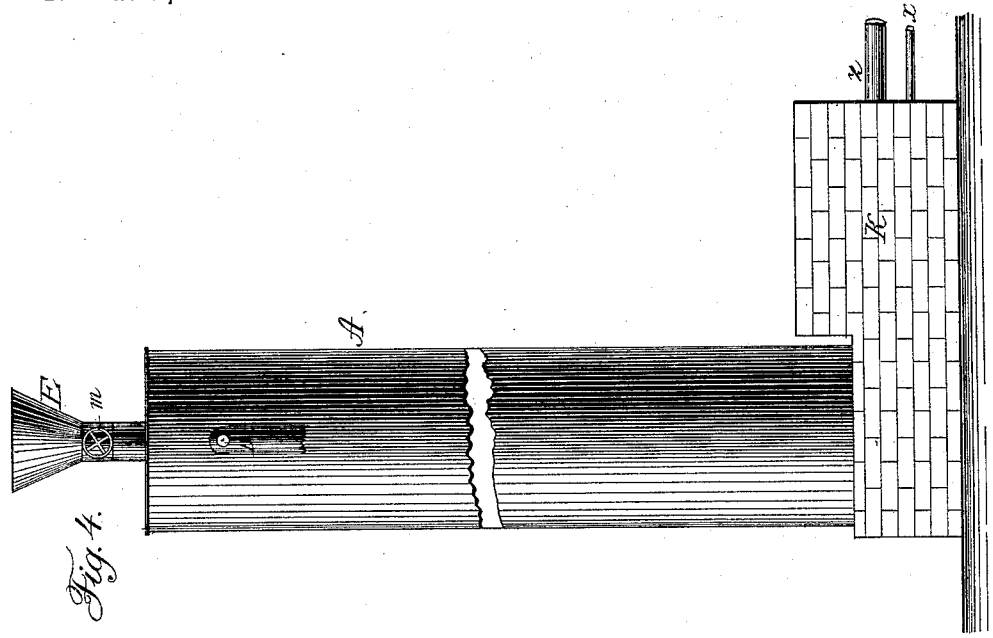
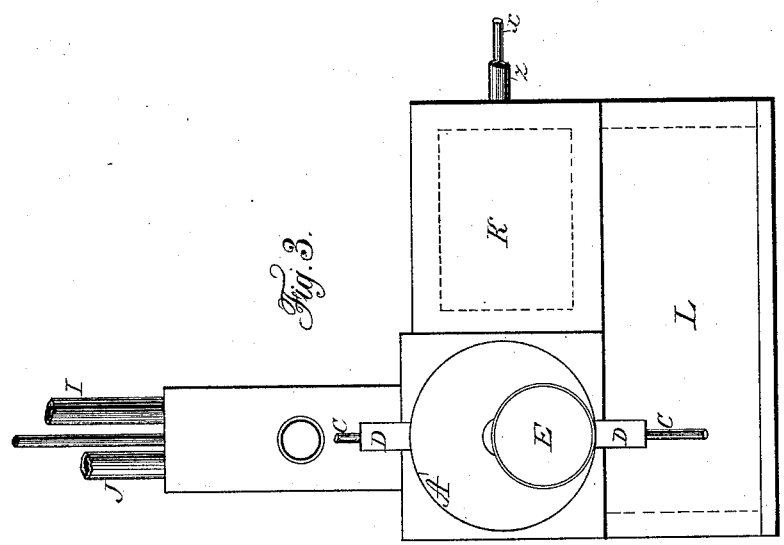
Witnesses
Leo Von Rosenberg
Roll Maynard
Inventor
T. B. Fogarty

UNITED STATES PATENT OFFICE.

THOMAS B. FOGARTY, OF LONG ISLAND CITY, NEW YORK, ASSIGNOR TO THE AMERICAN AMMONIA MANUFACTURING COMPANY, OF VIRGINIA.

PROCESS OF MAKING AMMONIA.

SPECIFICATION forming part of Letters Patent No. 417,778, dated December 24, 1889.

Application filed August 22, 1888. Serial No. 283,432. (No specimens.)

*To all whom it may concern:*

Be it known that I, THOMAS B. FOGARTY, of the city of Long Island City, county of Queens, and State of New York, have invented a new and useful Process of Manufacturing Ammonia; and I hereby declare the following to be a full, clear, and exact specification of the same, reference being had to the accompanying drawings, forming a part of this specification.

The object of my invention is to obtain ammonia by a simple and economical process from atmospheric nitrogen and the hydrogen of decomposed steam; and it consists in the matters hereinafter described and particularly pointed out.

In the accompanying drawings, which illustrate an apparatus adapted to carry out the present process, Figure 1 is a vertical and Fig. 2 a horizontal section on line $a\ a$. Fig. 3 is a plan, and Fig. 4 is a front elevation.

A is an ammonia-generating furnace adapted for the use of gaseous fuel, in which B is the combustion-chamber; C C and D D, pipes for the supply of gas and air, respectively; E, a hopper suitably provided with a feeder $m$; F, shelves or bafflers, and G a steam-pipe.

H is a supplemetary furnace for superheating steam and air, and contains the air-superheater I and steam-superheater J, both opening into the ammonia-generating furnace A.

K indicates a dust-collector, and L a water-trough.

The mode of operation is as follows: Admit suitably-adjusted volumes of gas and air through the pipes C and D, respectively, to the ammonia-generating furnace A, and, having ignited the gas by means of a suitable chimney, aspirator, or blower, or combination of such, I suck, pump, force, or draw the ignited gas duly mixed with a suitably-adjusted volume of air, or of steam and air mixed, through the ammonia-generating furnace A, from which they escape through a flue or chimney. (Not shown in the drawings.) The incandescent gases are for the present used solely for the purpose of heating the furnace itself, and are consequently permitted to escape; but as soon as I commence to make the ammonia, which I produce from the nitrogen of these gases, they become valuable, and consequently the flue or chimney or other outlet through which they are permitted to escape at first is closed, and they are directed through condensers, scrubbers, and other apparatus suitable for the collection and preservation of the ammonia, with which they are largely impregnated. It is evident that the interior of A will soon become intensely heated and that the escaping products of combustion will be extremely rich in nitrogen, and may thus be made to serve the double purpose of heating the furnace and at the same time furnishing incandescent nitrogenous gases capable of furnishing at the same time nitrogen to make the ammonia and heat to produce the reactions. Having brought my ammonia-generating furnace to a working-heat, I now start the feed $m$ of the hopper E, and by means thereof feed a suitably-adjusted volume of pulverized carbon and alkali into the ammonia-generator A, through which the fall of such pulverized carbon and alkali is retarded by the shelves or bafflers F, and in which the carbon and alkali soon become intensely heated by contact with the volume of actively incandescent nitrogenous gas—the volume of flame—with which the furnace is filled, and immediately unites with the incandescent nitrogen in the flame to form alkaline cyanides or cyanates, or a mixture of both, according as the volume of incandescent gases contains free oxygen or not or contains it in greater or less quantity. If I find upon examination that the compounds of cyanogen produced in my ammonia-generating furnace are in the form of cyanates, I proceed at once to decompose them by means of a suitable volume of steam admitted to A through the pipe J, and produce ammonia, oxides of carbon, hydrogen, and alkaline compounds. While it is not actually necessary to do so, I find it advantageous to superheat the steam admitted to A through the pipe J, as I thereby prevent, at least to a great extent, the cooling of A, and at the same time largely promote the rapid decomposition of the cyanates, and consequently produce a copious formation of ammonia. If, however, upon the contrary, I find upon examination that the compounds of cyanogen produced in my ammonia-generating furnace are entirely or to any great extent in the form of cyanides, I proceed to remedy this by increasing the volume of air admitted through the pipes D, or preferably by admitting a supplementary air-supply to A through the air-pipe I, and, as in the case of the steam admitted through the pipe J, preferably superheat this air, as I thereby insure a more certain and rapid conversion of my cyanides into cyanates. I am careful to admit the air through the pipe I at such a point in my ammonia-furnace A and at such a distance above or before the steam-pipe J that the oxygen of the air admitted through I shall have a sufficient time to act upon the cyanides and to insure their conversion into cyanates before they are subjected to the action of the steam admitted through J. In the plan of furnace shown in the drawings I effect this by introducing my supplementary air-supply into A at a point much higher up than that at which I introduce the steam, and consequently so as to give the contained oxygen time to reach and combine with the cyanides before the latter come under the influence of or have a chance of being decomposed by the steam introduced through J. The action of this supplementary air-supply in reference to its chemical effect is subsequent to the production of the cyanides, though the production of cyanides and their conversion into cyanates is continuous, and the air is supplied through pipe I simultaneously with the introduction and ignition of gas at the top of the furnace, and in a like sense the introduction of steam through pipe J is subsequent to the supplying of air to oxidize the cyanides, the present method being distinguished from those prior methods which introduce these agents simultaneously or together into a retort, and therefore in such manner that the gases, substances, or reagents are not able to act upon each other successively and substantially as herein described. Having converted my cyanides into cyanates, I now, as before, decompose the latter by steam, preferably superheated, introduced into the furnace A through the pipe J and produce ammonia, oxides of carbon, hydrogen, and alkaline compounds. From the ammonia-generating furnace A my gaseous products, mixed with suspended pulverulent matter, pass into a dust-collector K, of any ordinary construction, and at the inlet thereof meet with a volume of steam introduced through the pipe G, by which they are cooled and caused to deposit the pulverulent matter which they hold in suspension, and whence they pass through a series of condensers, scrubbers, and other apparatus of ordinary construction and have the contained ammoniacal gases and salts absorbed and collected as ordinary gas-liquor, ready to be treated and reduced to a commercial form by any of the usual processes.

Be it understood that I do not limit my claim of invention to the particular details of construction and operation herein described, for it is evident that these may be varied by those skilled in the art by substituting known equivalents acting substantially in the same manner and with like effect.

According to methods heretofore patented to me furnace-gases have been passed upwardly through a falling mixture of carbon and alkali and steam admitted above (or subsequently) to decompose the cyanogen sought to be produced by the prior operation, and in one case this steam was passed downwardly with the gaseous products of the first steps of the process. In another method the final products of combustion were passed up through a stationary mass of carbon and alkali, and yet in others air, gas, and steam, or gas and steam, were simultaneously introduced and passed downwardly with falling carbon and alkali. In the latter cases water-gas was produced and the desired production of cyanides thereby hindered.

In the cases above mentioned, in which gases or gaseous products were passed upwardly through the solids, the outlets were liable to be obstructed by fine material carried out of the furnace whenever any considerable amount of gases and steam (or sufficient to produce results on a commercial scale) were forced through the carbon and alkali, and, further, two distinct supplies of steam (or the equivalent) at separate points in the furnace were required to effect decompositions, which are accomplished by a single steam-supply in the present instance, and in none was a degree of heat secured sufficient for the best results.

By the present improvement air and gas are introduced and the latter burned in the presence of the moving solids employed, thus heating them and the furnace more directly and more highly than practicable by the use of final products generated outside of the furnace or by the use of superheated gases, and, further, all extraneous steam, or all steam except such inconsiderable portion as may be generated from the moisture in the solids, is excluded until after the production of cyanides has been effected and air is introduced in excess to convert the cyanides into cyanates. The steam-supply decomposes both the gaseous products of the prior steps of the operation and the solid cyanides, and this steam, as well as the air and gases, moves in the same direction and intermingles with the solids to secure an intimate contact and to afford time for the required reactions.

Free oxygen derived from any source will serve the purpose of converting cyanides into cyanates, and also a sufficient supply of this element in the incandescent furnace-gases employed is capable of effecting this result even without a secondary air-supply, though such secondary or supplemental supply is preferred, owing to the difficulty of regulating the oxygen when solely supplied with the furnace-gases; but, as above substantially indicated, oxygen is required in amount beyond that necessary to burn the heating-gas. It may be supplied in whole or in part by air either at the top of the furnace or at a lower point, as indicated.

What I claim, and desire to secure by Letters Patent, is—

1. The process herein described of producing ammonia, consisting in first introducing incandescent gases and air in excess of the quantity required to burn said gases into the presence of a moving mixture of pulverized carbon and alkali, then conducting these fluids and solids together in the same direction, thereby affording time for heating the solids and effecting desired reactions and producing alkaline cyanides and cyanates, and subsequently introducing steam to decompose these alkaline compounds and producing ammonia and other products, substantially as described.

2. In the process of making ammonia, the steps consisting in first introducing incandescent gases and air in excess of the quantity required to burn said gases in the presence of a moving mixture of pulverized carbon and alkali, then conducting these fluids and solids together in the same direction, thereby affording time for heating the solids and effecting desired reactions, and subsequently introducing oxygen to convert alkaline cyanides into cyanates, substantially as described.

3. In the process of making ammonia, the steps consisting in causing cyanides to combine with oxygen and to form cyanates; second, subsequently decomposing the cyanates so formed by steam, producing ammonia, oxides of carbon, hydrogen gas, and alkaline compounds, substantially as described.

4. In the process of making ammonia, the step consisting in supplying air in excess of the amount required for the combustion of gases and production of cyanides to convert the latter into cyanates, substantially as described.

In testimony whereof I have signed my name to this specification before two subscribing witnesses.

THOS. B. FOGARTY.

Witnesses:
JOHN JENKINS, Jr.,
DAVID BLANK.